United States Patent [19]

Bahn

[11] Patent Number: 5,231,342
[45] Date of Patent: Jul. 27, 1993

[54] STEPPING MOTOR

[75] Inventor: Itsuki Bahn, Nerima, Japan

[73] Assignee: Kabushikigaisha Sekogiken, Tokyo, Japan

[21] Appl. No.: 646,725

[22] PCT Filed: May 28, 1990

[86] PCT No.: PCT/JP90/00683
§ 371 Date: Mar. 14, 1990
§ 102(e) Date: Mar. 14, 1990

[87] PCT Pub. No.: WO90/15475
PCT Pub. Date: Dec. 13, 1990

[30] Foreign Application Priority Data

May 31, 1989 [JP] Japan .................. 1-135782
Aug. 8, 1989 [JP] Japan .................. 1-203789

[51] Int. Cl.$^5$ .................................. F02P 8/00
[52] U.S. Cl. ........................... 318/696; 318/685
[58] Field of Search ..................... 318/685, 696

[56] References Cited

U.S. PATENT DOCUMENTS

| | | | |
|---|---|---|---|
| 4,477,757 | 10/1984 | Palombo et al. | 318/685 X |
| 4,533,861 | 8/1985 | Rogers et al. | 318/696 |
| 4,757,247 | 7/1988 | Ranger | 318/696 |
| 4,896,088 | 1/1990 | Jahns | 318/696 |
| 5,012,171 | 4/1991 | Sember | 318/696 |

Primary Examiner—William M. Shoop, Jr.
Assistant Examiner—Karen Masih
Attorney, Agent, or Firm—Staas & Halsey

[57] ABSTRACT

The present invention is a stepping motor used as a driving source for stepping movement of autmatic-machine members. Diodes are connected to the terminal side of a DC power source in a forward direction to prevent accumulated magnetic energy from returning to the power source. A high-voltage large current due to reduction of magnetic energy rushes into an exciting coil to be excited, the magnetic energy of the exciting coil quickly decreases, and a high-speed stepping operation is exeuted. Moreover, the digital signal of each address in a ROM corresponding to the number of steps is read, the read digital signal is converted into an analog signal, acceleration is executed by the frequency of the stepping electric signal corresponding to the frequency proportional to the analog signal for the shortest time without outstepping, and deceleration is executed for the shortest time by reading the ROM backward when the number of steps is halved.

Therefore, the numerical control of load movement can be executed for a shortest time without outstepping.

4 Claims, 11 Drawing Sheets

STEPPING MOTOR

BACKGROUND OF THE INVENTION

1. Field of the Invention

The present invention relates to a stepping motor used as a driving source for stepping movement of automatic-machine members.

2. Description of the Related Art

Though a stepping motor using a magnet rotor is already known in the art, it has disadvantages of small output torque and stepping speed.

When increasing the output torque, the stepping speed decreases. To perform the specified operation stepping at a high speed without outstepping, the prior art slowly increases the frequency of the stepping electric signal and slowly decreases it to step. However, the prior art has many problems including that the electric circuit is complicated and expensive and it is difficult to obtain a satisfactory performance.

For one stepping operation, one exciting coil is turned off, the accumulated magnetic energy is discharged, and magnetic energy is accumulated when the next exciting coil is turned on. Discharge and accumulation of the magnetic energy requires time. For a large output torque, the stepping time increases and high-speed stepping is impossible because large magnetic energy is accumulated.

To avoid the above-mentioned disadvantage, means is provided to execute high-speed stepping by raising the applied voltage to quickly accumulate magnetic energy and returning the accumulated magnetic energy to the power source to quickly decrease it. However, the means has the following two disadvantages. First, the means cannot be used under a low voltage because the applied voltage is too high.

Secondly, because the means is limited to high-speed stepping, it is impossible to achieve a higher-speed stepping operation.

SUMMARY OF THE INVENTION

An object of the present invention is to provide a stepping motor having a large output torque and having a simplified circuit configuration capable of performing the specified stepping operation at a high speed without outstepping.

The present invention is a reluctance-type motor comprising an n-phase (n=2, 3, 4, ...) full-wave rotor having salient poles, n-phase exciting coils installed on n-phase magnetic poles, semiconductor switching devices connected to both sides of the first, second, third, ..., and n-th phase exciting coils configured into the first and first-bar exciting coils, the second and second-bar exciting coils, the third and third-bar exciting coils, ..., and n-th bar exciting coils, respectively, diodes inversely connected to a serially-connected body of the exciting coils corresponding to the semiconductor switching devices, a DC power source for apply voltage to the exciting coils through the semiconductor switching devices, the first and first-bar exciting coils excited by the first backflow-preventive diode connected to the positive pole of the DC power source in the forward direction, an excitation control circuit consisting of the second and second-bar exciting coils, the third and third-bar exciting coils, ..., and n-th and n-th-bar exciting coils respectively excited by the similarly-connected second, third, ..., and n-th backflow-preventive diodes, a specified-frequency n-phase full-wave stepping electric-signal generator, and an electric circuit to generate stepping torque by electrifying the semiconductor switching devices respectively connected to the first, second, third, ..., and n-th phase exciting coils by the stepping electric signal. Furthermore, the present invention is a reluctance-type stepping motor.

The reluctance-type stepping motor of the present invention comprises an n-phase (n=3, 4, 5, ...) half-wave rotor having salient poles, n-phase exciting coils installed on n-phase magnetic poles, semiconductor switching devices connected to both sides of the first, second, third, ..., and n-th phase exciting coils respectively configured into the first, second, third, ..., and n-th exciting coils, diodes inversely connected to a serially-connected body of the exciting coils corresponding to the semiconductor switching devices, a DC power source apply voltage to the exciting coils through the semiconductor switching devices, the first exciting coil excited by the first backflow-preventive diode connected to the positive pole of the DC power source in the forward direction; an excitation control circuit including the second, third, ..., and n-th exciting coils respectively excited by the similarly-connected second, third, ..., and n-th backflow-preventive diodes, and first, second, third, ..., and n-th small-capacity condensers connected between the outpot side of the backflow preventive diodes and the negative side of the DC power source, a specified-frequency n-phase half-wave stepping electric-signal generator, and an electric circuit to generate stepping torque by electrifying the semiconductor switching devices connected to respectively-corresponding first, second, third, ..., and n-th phase exciting coils by the stepping electric signal. Furthermore, the present invention comprises, in the first or second means, a stepping electric-signal generator consisting of a memory circuit to memorize the specified number of steps, an electric circuit to input the number of steps to the first counting circuit and half the number of steps to the second counting circuit, an electric circuit to start subtraction of the first and second counting circuits according to the the number of steps, read the digital memory stored in a ROM, and inversely read the digital memory of the ROM by the zero-count output signal of the second counting circuit when the stepping motor starts, an oscillation circuit to convert the read signal of the ROM into an analog signal to obtain the frequency of the oscillation pulse proportional to the analog signal, a pulse distributor to output an n-phase full- or half-wave stepping electric signal by inputting the frequency of the output oscillation pulse of the oscillation circuit, and an electric circuit to start inputting the output stepping electric signal of the pulse distributor to the excitation control circuit of the motor by the driving start command electric signal of the reluctance-type stepping motor and to stop inputting the oscillation-circuit pulse to the pulse distributor when the first counting circuit counts zero.

Furthermore, the present invention includes a stepping motor comprising an n-phase (n=2, 3, 4, ...) full-wave magnet rotor, n-phase exciting coils installed on n-phase magnetic poles of a fixed armature, an excitation control circuit including several sets of transistors including exciting coils of various phases, diodes inversely connected to each transistor of the circuit in parallel to return magnetic energy to the power supply side when exciting coils are turned off, a DC power source to apply voltage to the excitation control circuit, an electric circuit to supply power to the excitation control circuit including several sets of transistors through "n" backflow-preventive diodes connected to the DC power source in the forward direction, a specified-frequency n-phase full-wave stepping electric-signal generator, and an apparatus to generate stepping torque by electrifying the excitation control circuit including several sets of transistors having corresponding first, second, third, . . . , and n-th exciting coils by said stepping electric signal.

Furthermore, the present invention is a stepping motor comprising an n-phase (n=3, 4, 5, . . . ) half-wave magnet rotor, n-phase exciting coils installed on n-phase magnetic poles of a fixed armature, transistors connected to both sides of the exciting coils, diodes connected to a serially-connected body of said exciting coils corresponding to said transistors, a DC power source to apply voltage to exciting coils through the transistors, an excitation control circuit to respectively electrify n-phase exciting coils through "n" backflow-preventive diodes connected to the DC power source in the forward direction, "n" condensers with the specified capacity connected between the output sides of the backflow-preventive diodes and the negative pole of the DC power source, a specified-frequency stepping electric-signal generator, and an electric circuit to generate stepping torque by electrifying the transistors connected to the both sides of respectively-corresponding n-phase exciting coils by said stepping electric signal.

Furthermore, the present invention comprises, in the fourth or fifth means, a stepping electric-signal generator including a memory circuit to memorize the specified number of steps, an electric circuit to input the number of steps to the first counting circuit and half the number of steps to the second counting circuit; electric means to start subtraction of the first and second counting circuits according to the number of steps, read the digital memory stored in a ROM, and execute backward reading the digital memory of the ROM by the zero-count output signal of the second counting circuit when the stepping motor starts, an oscillation circuit to convert the read signal of the ROM into an analog signal to obtain the frequency of the oscillation pulse proportional to the analog signal, a pulse distributor to output n-phase full- or half-wave stepping electric signals by inputting the frequency of the output oscillation pulse of the oscillation circuit and an electric circuit to start inputting the output stepping electric signal of the pulse distributor to the excitation control circuit of the motor by the driving start command electric signal of the stepping motor and to stop inputting the oscillation-circuit pulse to the pulse distributor when the first counting circuit counts zero.

According to the present invention, when a diode is connected to a positive or negative terminal of an applied DC power in the forward direction and the accumulated magnetic energy is prevented from returning to the power source, a large high-voltage current due to a decrease of magnetic energy rushes into the exciting coil to be next excited, rapid accumulation of magnetic energy is completed, and the magnetic energy of the preceding exciting coil quickly decreases. Therefore, a high-speed stepping operation is realized.

If a time lag is present between the end of excitation of the precedent exciting coil and start of excitation of the next exciting coil, the same purpose can be realized by temporarily charging magnetic energy in a condenser with a small capacity (0.1 to 0.3 uF).

As the result of measurement, magnetic energy can be moved at the output of at approx. 300 W for approx. 20 microseconds. Therefore, a stepping motor with a large output torque and rotational speed can be obtained.

As mentioned later about FIG. 4, with respect to FIG. 4 the digital signal quantity in each address of the ROM corresponding to the number of steps is read, the digital signal is converted into an analog signal, acceleration is executed for the shortest time by the stepping electric signal corresponding to the frequency proportional to the analog signal without outstepping, and deceleration is executed for the shortest time by inversely reading the ROM when the number of steps is halved.

Therefore, load movement can be numerically controlled for the shortest time without outstepping.

Thus, the control circuit can be simplified because the first effect is obtained only by adding a diode and small-capacity condenser to the power source side. Also, the applied DC voltage can be decreased.

Moreover, the load can be numerically controlled at the maximum speed without outstepping.

DESCRIPTION OF THE PREFERRED EMBODIMENTS

Figure 1:
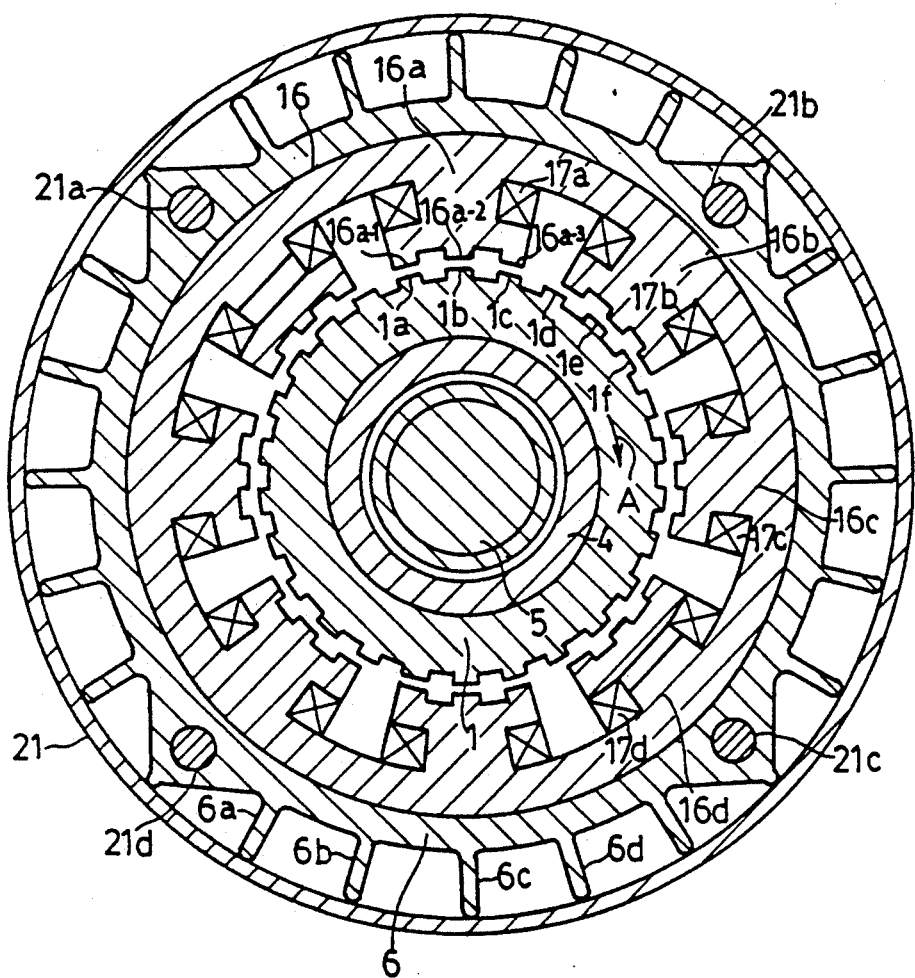
FIGS. 1(a), 1(b), and 1(c) show are a schematic diagrams of the magnetic rotor, the magnetic pole and exciting coil according to the present invention.
Figure 1:
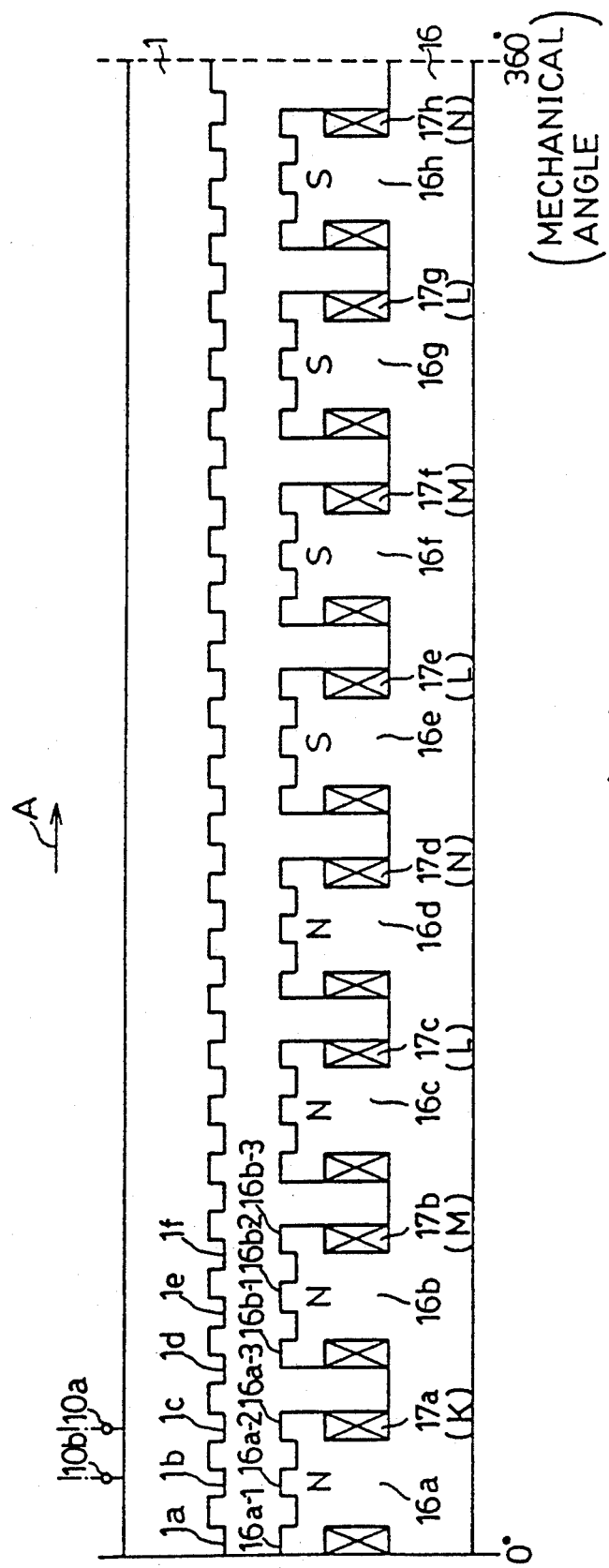
Figure 1:
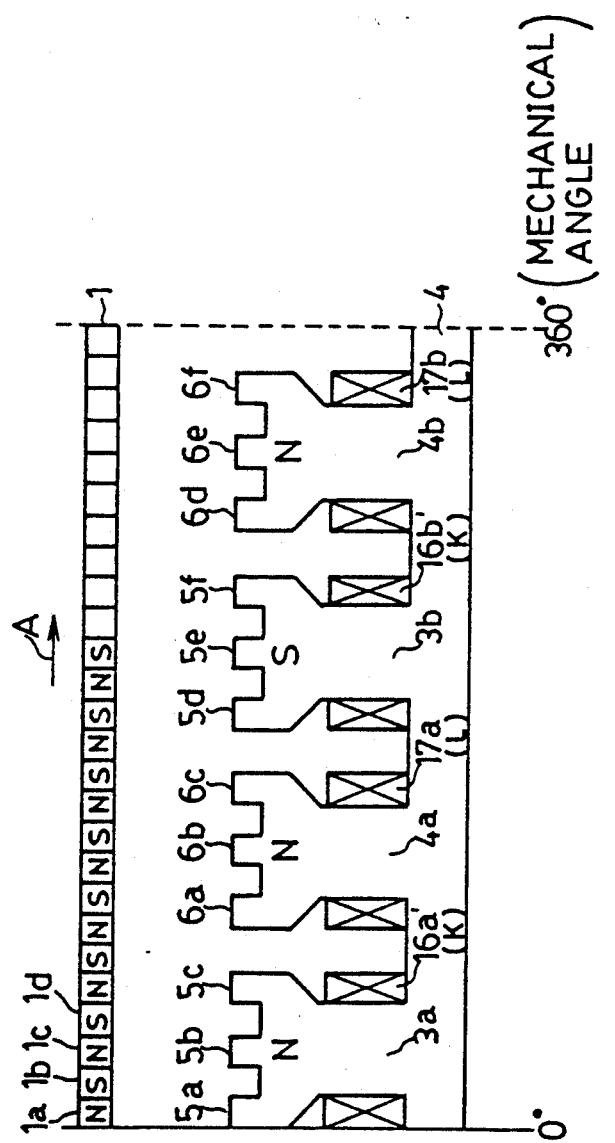

A following is the description of embodiments of the present invention according to FIGS. 1(a), 1(b), and 1(c).

FIG. 1(a) is a sectional view showing the configurations of the salient poles of the rotor and of magnetic poles and exciting coils of the fixed armature of a 2-phase reluctance-type stepping motor to which the present invention is applied.

All subsequent angles are shown in electrical angles.

The salient poles 1a, 1b, etc. of the rotor 1 have a width of 180° respectively and are arranged at equal pitch with a phase difference of 360°.

The rotor 1 is a known means in which silicon steel plates are laminated and include the rotary shaft 5.

The balls of the ball bearing 4 are not illustrated.

The magnetic poles 16a, 16b, etc. are made by the same means as that of the rotor 1 together with the fixed-armature magnetic core 16 to serve as a magnetic path.

The protruded teeth 16a-1, 16a-2, are installed on the ends of the magnetic poles 16a, 16b, etc. respectively. The teeth have a width of 180° and are separated by equal angles.

The exciting coils 17a, 17b, etc. are set to the magnetic poles 16a, 16b, etc. which are arranged on the peripheral surface at an equal pitch as shown in FIG. 1(a).

FIG. 1(b) is development of the magnetic pole and salient pole.

The cooling fins 6a, 6b, etc. in FIG. 1(a) are used for radiating heat. A base 6 is fitted to the outside of the fixed armature 16.

The outer cylinder 21 serves as a cover of the cooling fins 6a, 6b, etc.

The round holes 21a, 21b, etc. are tapped holes for fastening with machine screws.

The following is a detailed description of the sectional view of FIG. 1(a) and the development in FIG. 1(b).

The annular ring 11 and magnetic poles 16a, 16b, etc., are known in the art and in which silicon steel plates are laminated and secured, configuring a fixed armature. The magnetic core 16 serves as a magnetic path.

The exciting coils 17a, 17b, etc. are set to the magnetic poles 16a, 16b, etc. The salient poles 1a, 1b, etc. are installed on the periphery of the rotor 1, which face the teeth 16a-1, 16a-2, etc. of the magnetic poles 16a, 16b, etc. with a gap of 0.1 to a 0.2 mm. The tooth width is equal to salient-pole width. The separation angle between teeth is 180°.

For the teeth 16a-1, 16a-2, 16a-3, etc. in FIG. 1(b), three teeth are used for one magnetic pole. However, two or more than three teeth can be used for one magnetic pole.

The output torque increases, the stepping angle decreases, and the resolution is improved proportionally to the number of teeth per magnetic pole.

When the exciting coils 17a and 17e (a serially- or parallely-connected body of both coils is called the exciting coil K) are excited, the teeth and salient poles are attracted to each other. At the same time, exciting coils 17b and 17f (a serially- or parallely-connected body of both coils is called the exciting coil M) are excited.

Therefore, the exciting coils are driven by a specified angle from the position shown in FIG. 1(b) in the direction of the arrow and stop.

The stop point is the point where the reverse torque due to the magnetic poles 16a and 16e is balanced with the normal torque due to the magnetic poles 16b and 16f.

In the time chart of FIG. 6, the former torque curve is shown as the curve 39a and the latter torque curve is shown as the curve 39b.

The broken line represents the reverse torque and the above-mentioned balance point is the point on the straight line 40. Though the point on the straight line 40 depends on the shape of the torque curve, a torque curve shape is preferable in which the return torque increases when the rotor 1 is horizontally deviated.

Therefore, the above-mentioned object is achieved by changing the shape of the facing plane between a salient pole and a tooth. When the exciting coils 17a and 17e are turned off, the exciting coils 17c and 17g (a connected body including both coils is called the exciting coil L) are excited and the rotor 1 rotates by 90° and stops.

When the exciting coils 17b and 17f are turned off, the exciting coils 17d and 17h (a connected body including both coils is called the exciting coil N) are excited.

As mentioned above, a 2 phase full-wave stepping motor with one step of 90° is obtained.

FIG. 1 (c) is a development of the 2-phase full-wave stepping motor to which the present invention is applied, showing the configurations of the N and S magnetic poles of the rotor, the magnetic pole of the fixed armature, and the exciting coil.

All subsequent angles are shown in electrical angles.

The N and S magnetic poles 1a, 1b, etc. having a width of 180° are alternately arranged on the magnet rotor 1.

The same-phase magnetic poles 3a and 3b are separated from each other by 180° in mechanical angle and the same-phase magnetic poles 4a and 4b separate from each other by 90° in phase and are installed on the fixed armature 4.

Three teeth (salient poles) separated from one another by the same distance are protrusively installed on the magnetic poles 3a and 4a respectively as shown in the FIG. 1 (c) which have the same width as the magnetic poles 1a, 1b, etc. and are separated from each other by the same distance.

The magnet rotor 1 is an introversion type and rotatably supported by a rotary shaft (not illustrated).

The fixed armature 4 is configured by a known means in which silicon steel plates are laminated and fixed.

The exciting coils 16a, and 16b, are set to magnetic poles 3a and 3b, and the exciting coils 17a and 17b are set to the magnetic poles 4a and 4b.

The embodiment in FIG. 1 (c) uses the teeth 5a, 5b, and 5c, and the teeth 6a, 6b, and 6c for one magnetic pole respectively. However, two teeth or more than three teeth can be used for each magnetic pole.

The output torque increases, the stepping angles decrease, and the resolution is improved proportionally to the number of teeth per magnetic pole.

When the exciting coils 16a, and 16b, in FIG. 1 (a serially-or parallely-connected body of both coils is called the exciting coil K) are excited, and teeth and magnetic poles are attracted or repelled.

At the same time, the exciting coils 17a and 17b (a connected body of both coils is called the exciting coil L) are excited. Therefore, they are driven by the specified angle from the position shown in FIG. 1 in the direction of the arrow and stop.

The stop point is the point where the reverse torque due to the magnetic poles 4a and 4b is balanced with the normal torque due to the magnetic poles 3a and 3b.

In the time chart of FIG. 6 (a) or 6 (b), the former torque curve is shown as the curve 39a and the latter torque curve is shown as the curve 39b.

The broken line represents the reverse torque and the above-mentioned balance point is the point on the straight line 40. Though the point on the straight line 40 depends on the shape of the torque curve, a torque curve shape is preferable in which the return torque increases when the rotor 1 is horizontally deviated.

Then, because the exciting direction of the exciting coils 17a and 17b is reversed, normal torque is generated, the magnet rotor rotates by 90° and stops when the normal torque is balanced with the reverse torque due to the magnetic poles 3a and 3b.

As mentioned above, a 2-phase full-wave stepping motor to perform stepping every 90° is obtained by repeatedly exciting the exciting coils 16a and 16b and the exciting coils 17a and 17b.

Figure 2A:
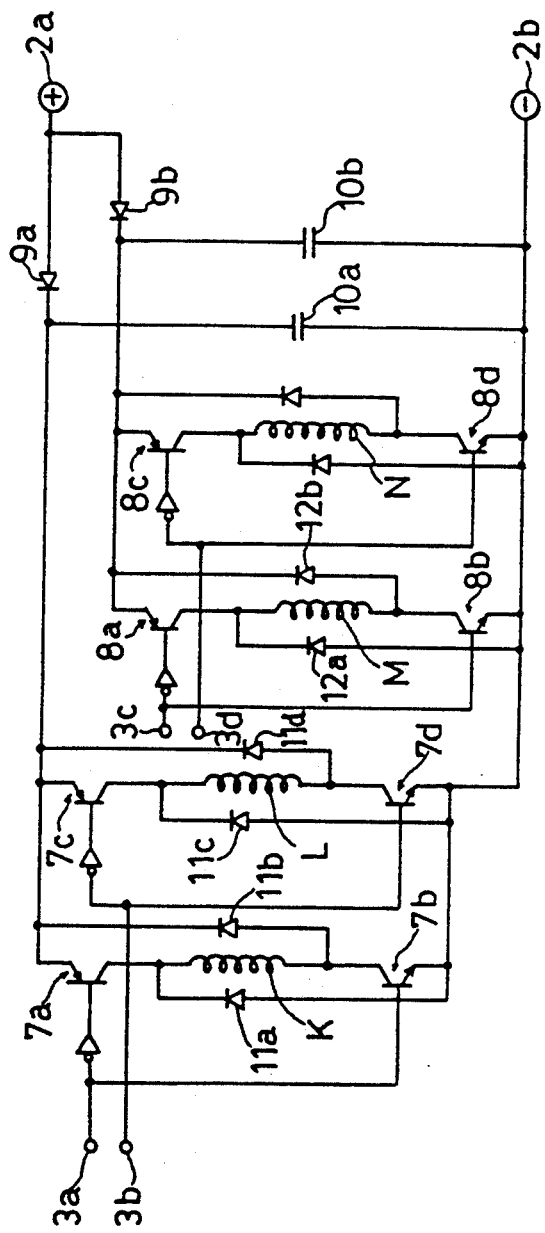
FIGS. 2(a) through 2(d) are the excitation control circuits accrding to the present invention.
Figure 2:
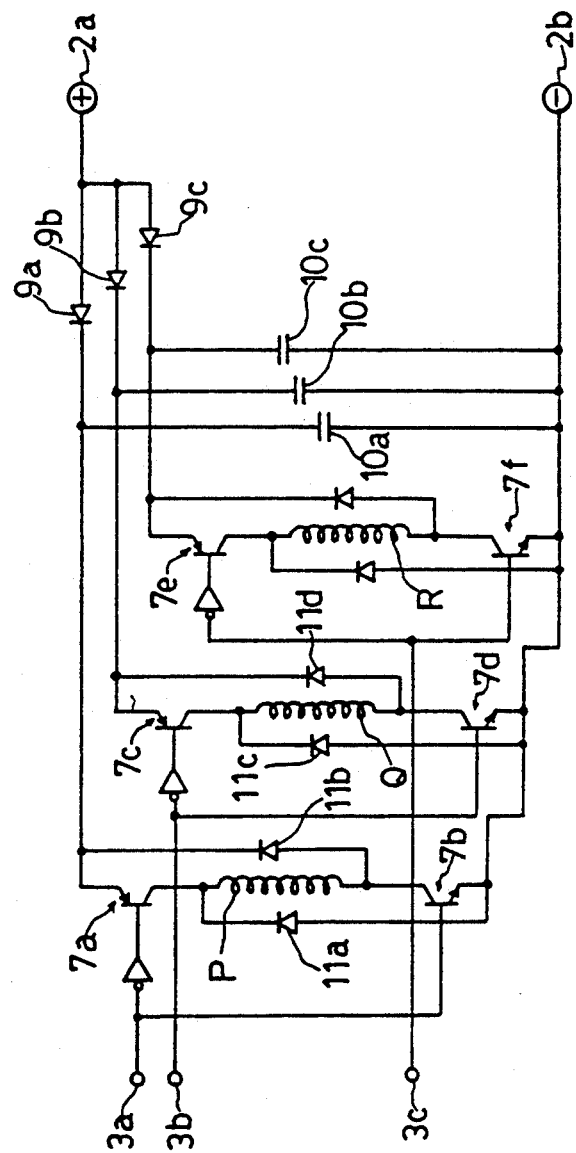
Figure 2:
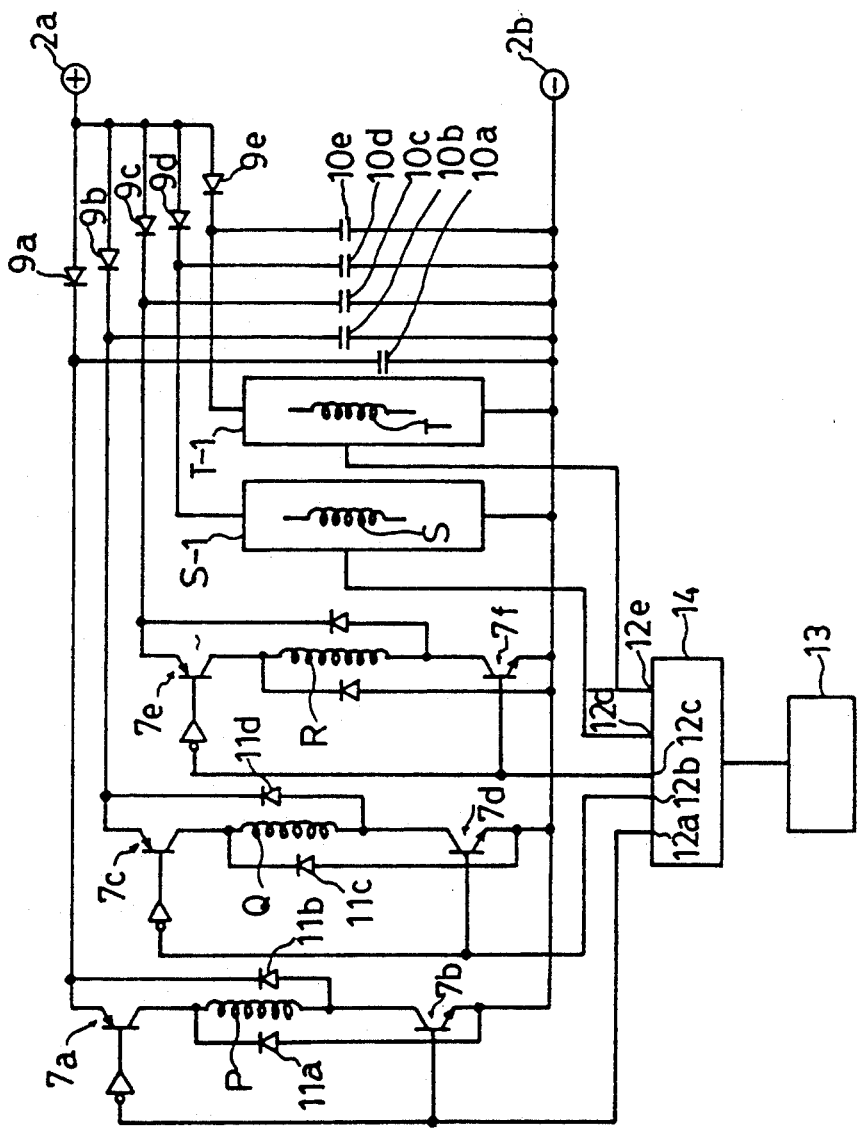
Figure 2:
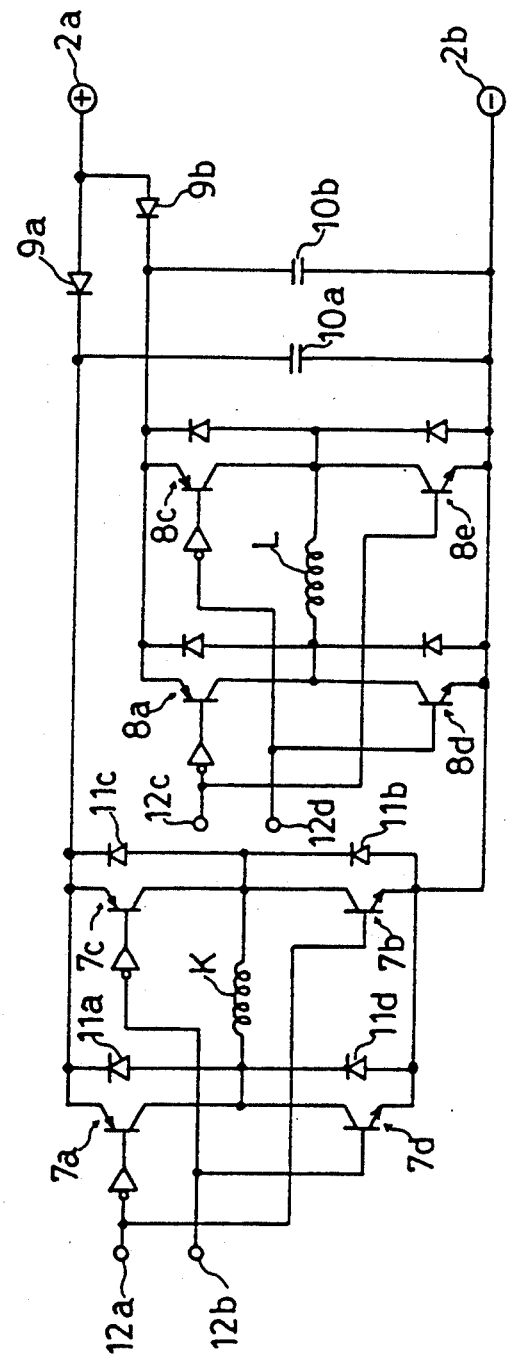

The following is a detailed description of excitation control of the exciting coils K, L, M, and N according to FIG. 2(a).

Figure 3:
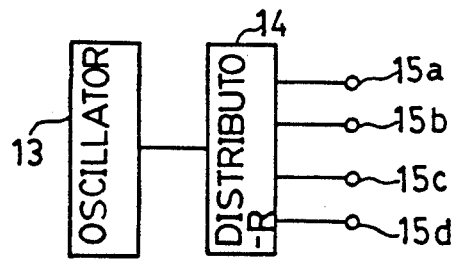
FIG. 3 is a block circuit diagram of the stepping electric-signal generator.

In FIG. 2(a), the inputs of the terminals 3a, 3b, and 3c receive the stepping electric signal which can be obtained from the known circuit shown in FIG. 3.

In FIG. 3, the block circuit 13 is an oscillator which outputs electric pulses with the specified frequency. The output electric pulse is input to the pulse distributor 14 and then output as a 2-phase full-wave stepping electric signal from the terminals 15a, 15b, 15c, and 15d.

The outputs of the terminals 15a, 15b, etc. are input to the terminals 3a, 3b, etc. in FIG. 2(a) respectively.

Figure 6A:
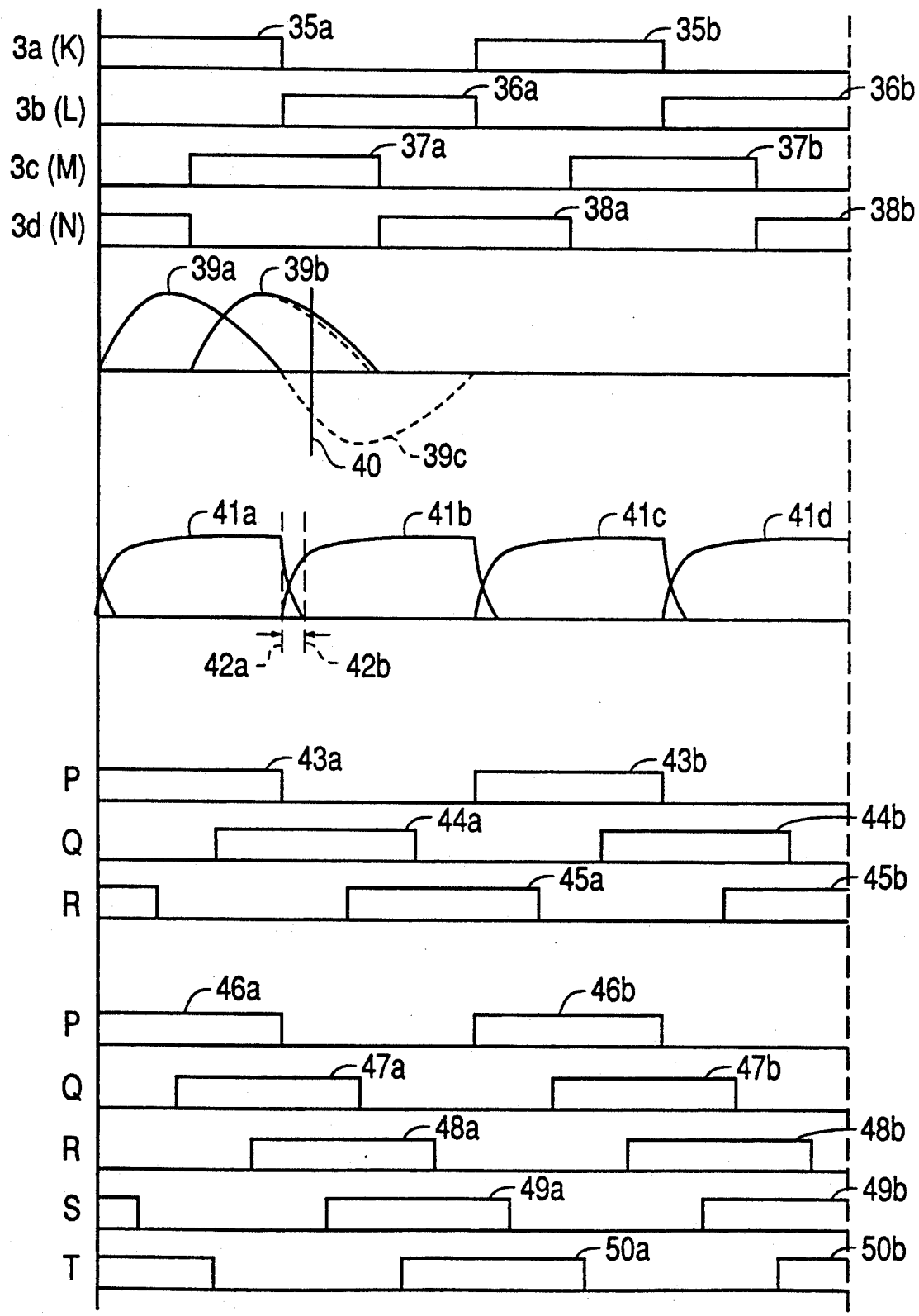
FIGS. 6(a) and 6(b) are time charts showing the curves of the stepping electric signal, output torque, and exciting current.

The inputs of the terminals 3a (exciting coil K) and 3b (exciting coil L) are shown as the curves 35a, and 35b, and the curves 36a and 36b in the time chart of FIG. 6(a).

The inputs of the terminals 3c (exciting coil M) and 3d (exciting coil N) are shown as the curves 37a and 37b and the curves 38a and 38b in FIG. 6(a) whose phase is delayed by 90°.

Because the transistors 7a and 7b are turned on by the electric signal of the curve 35a input to the terminal 3a, the exciting coil K excited. After a certain time elapses, because the electric signal of the curve 37a is input from the terminal 3c, the transistors 8a and 8b are turned on and the exciting coil M is excited.

Therefore, as previously mentioned about the torque curves 39a and 39b, the coil stops at a point on the straight line 40. Then, because the electric signal of the curve 36a is input from the terminal 3b, the transistors 7c and 7b are turned on and the exciting coil L is excited.

In this case, because the input of the terminal 3a is simultaneously disconnected, the transistors 7a and 7b are turned off.

According to a known means, the magnetic energy accumulated in the exciting coil K is returned to the power source through the diodes 11c and 11b. Therefore, it is impossible to decrease the reduction time of the magnetic energy unless the applied voltage is raised.

If the source voltage is raised, the exciting coil current excessively increases and burning occurs.

If a rapid stepping operation is executed, reverse torque is generated due to the discharge current of magnetic energy and the output torque is decreased.

Moreover, because start of excitation of the exciting coil L to be next excited is delayed, torque is decreased.

The apparatus of the present invention has the effect to eliminate the above problems by adding the diode 9a shown in FIG. 2(a).

That is, because the power of the exciting coil K is disconnected, discharge of the accumulated magnetic energy is interrupted by the diode 9a, a high voltage is applied to the exciting coil L through the transistors 7c and 7d which are simultaneously turned on and magnetic energy is quickly accumulated.

The curves 41a, 41b, 41c, and 41d in FIG. 6(a) show the excitation curves of the exciting coils K and L.

The width between the trailing edge of the curve 41a (current of the exciting coil K) and the leading edge of the curve 41b (current of the exciting coil L) becomes equal to the width between the broken lines 42a and 42b and the curves become very steep.

It takes 30 microseconds for a motor with an output of 300 W. Therefore, even if the stepping frequency is increased, no reverse or decrease torque mentioned above is generated. Thus, high-speed stepping is realized without problems.

Moreover, a low voltage can be used for the voltage between the power-source terminals 2a and 2b because only the specified exciting current may be supplied exceeding the counter electromotive force.

Also for excitation of the exciting coils M and N according to the curves 37a and 37b and the curves 38a and 38b in FIG. 6, the above-mentioned effect is the same. The diode 9b also has the same effect as the diode 9a.

Though the condensers 10a and 10b are not always necessary, they protect transistors if there is any difference between the turning-on/off timings.

Though this embodiment describes a 2-phase full-wave stepping motor, it can also be applied to 3-phase, 4-phase, . . . , and n-phase full-wave stepping motors.

In this specification, the first-phase exciting coils K and L are considered as the first and first-bar exciting coils and the second-phase exciting coils M and N are considered as the second and second-bar exciting coils. The same is true for a case in which the number of phases increases.

The following is a description of an excitation control circuit of a 3-phase half-wave reluctance-type stepping motor according to FIG. 2(b).

Input signals of the stepping motor input from the terminals 3a, 3b, and 3c are obtained from a known oscillator and pulse distributor. Input signals of the terminals 3a, 3b, and 3c are shown as the electric signal curves 43a and 43b, the curves 44a and 44b, and the curves 45a and 45b respectively.

The curves 43a, 44a, and 45a have a phase delay of 120° respectively.

The exciting coils P, Q, and R are installed on six magnetic poles respectively and every two poles are symmetrically arranged. Therefore, six combinations of the magnetic poles and an exciting coil are made and the exciting coils are arranged at the periphery with a separation of 60° in mechanical angle.

When the stepping electric signal is input from the terminals 3a and 3b, the transistors 7a, 7b, 7c, and 7d are turned on and the exciting coils P and Q are excited. The rotor is driven and stops at the specified position.

Then, when the input signal to the terminal 3a disappears, the rotor rotates by the specified angle and stops because the signal is input to the terminal 3c. The stepping angle becomes 120°.

Exciting coils are excited in order of P, Q→Q, R→R, P→P, Q→.

When the electric signal of the curve 43a disappears which is the input signal to the terminal 3a, the magnetic energy is not returned to the power source but it is accumulated in the condenser 10a because the diode 9a is connected. By decreasing the capacity of the condenser to a value corresponding to the inductance of the exciting coil P, it is charged at a high voltage.

Therefore, the magnetism of the exciting coil P quickly decreases. After a certain time elapses, the exciting coil P is excited again by the electric signal of the curve 43b. In this case, the exciting current quickly rises due to the high voltage of the condenser 10a.

The exciting coils Q and R, the diodes 9b and the 9c, and condensers 10b and 10c have the same effect.

Thus, high-speed stepping is realized at a low source voltage. This embodiment describes a 3-phase half-wave stepping motor. However, it can also be applied to 4-, 5-, ..., and n-phase stepping motors, realizing the same effect.

The exciting coil of the first phase is called the first exciting coil, and the exciting coils of the second and third phases are called the second and third exciting coils, respectively.

As mentioned above, according to the apparatus of the present invention, the reluctance-type stepping motor having a large output torque corresponding to a high stepping frequency can be obtained. Therefore, an effective technical means can be obtained because a low source voltage can be used.

The following is a description of an embodiment of a 5-phase half-wave stepping motor of the present invention according to FIG. 2(c).

The exciting coils P, Q, R, S, and T installed on a 5-phase magnetic pole function as the first-, second-, ..., and fifth-phase exciting coils respectively.

The stepping electric signals are output from the terminals 12a, 12b, etc. in FIG. 6(a) when the transistors 7a and 7b are turned on and the exciting coil P is excited.

Electric pulses with the specified frequency are input to the pulse distributor 14 from the oscillator 13 and the stepping electric signals from the output terminals 12a, 12b, ..., and 12e are shown as the curves 46a and 46b, the curves 47a and 47b, the curves 48a and 48b, the curves 49a and 49b, and the curves 50a and 50b, respectively in FIG. 6(a).

The phases of the curves 46a, 47a, 48a, 49a, and 50a are sequentially delayed by 72°. The curves have a width of 180° respectively and are separated by the same angle from one another.

The transistors 7c, 7e, and 7f are turned on by the stepping electric signals from the terminals 12b and 12c and the exciting coils Q and R are excited.

The block circuits S-1 and T-1 control the exciting coils S and T, which have same configuration as that of the excitation control circuit for the exciting coil P.

Therefore, the exciting coils S and T are excited by the stepping electric signals from the terminals 12d and 12e.

When the exciting coils P, Q, and R are excited, the rotor stops at the point past the right end of the curve 46a. When the exciting coils Q, R, and S are excited, the rotor stops at the point past the right end of the curve 47a.

The rotor 1 is driven by the fact that excitation is repeated in order of the exciting coils P, Q, and R, exciting coils Q, R, and S, exciting coils R, S, and T, exciting coils S, T, and P, exciting coils T, P, and Q, and exciting coils P, Q, and R.

The exciting coils excited when the output electric pulse of the oscillator in FIG. 6(a) is stopped are shown below only by their symbols, (P, Q), (P, Q, R), (Q, R), (Q, R, S), (R, S), (R, S, T), (S, T), (S, T, P), (T, P), (T, P, Q).

Therefore, one cycle is completed in 10 steps with a stepping angle of 36°.

The exciting coils P, Q, R, S, and T are installed on 10 magnetic poles respectively. Every two poles are symmetrically arranged and simultaneously excited.

Therefore, ten combinations of the magnetic poles and an exciting coil are made and the exciting coils are arranged at periphery with a the separation angle (mechanical angle) of 36°.

When the electric signal of the curve 46a disappears which is the output signal of the terminal 12a, the magnetic energy is not returned to the power source but is accumulated in the condenser 10a because the diode 10a is connected. By decreasing the capacity of the condenser to a value corresponding to the inductance of the exciting coil P, it is charged at a high voltage.

Therefore, the magnetism of the exciting coil P quickly decreases. After a certain time elapses, the exciting coil P is excited again by the electric signal of the curve 46b. In this case, the exciting current quickly rises due to the high voltage of the condenser 10a. Thus, a high-speed stepping motor with a large output torque is realized.

The diodes, 9b, 9c, 9d, and 9e and the condensers 10b, 10c, 10d, and 10e for excitation control of the exciting coils Q, R, S, and T have the same effect.

It is the same as the embodiment in FIG. 2(b) that the condensers 10a, 10b, ..., and 10e serve as necessary parts.

Other effects are the same as those of the embodiment in FIG. 2(b).

In FIGS. 2(a), 2(b), and 2(c), the diodes 9a, 9b, 9c, etc. are installed at the positive pole 2a side of the power source.

However, the same effect is also obtained by removing these diodes, applying voltage to each exciting coil from the positive pole 2a side of the power source, and independently applying the exciting current of each exciting coil to the negative pole 2b of the power source through a diode.

Figure 4:
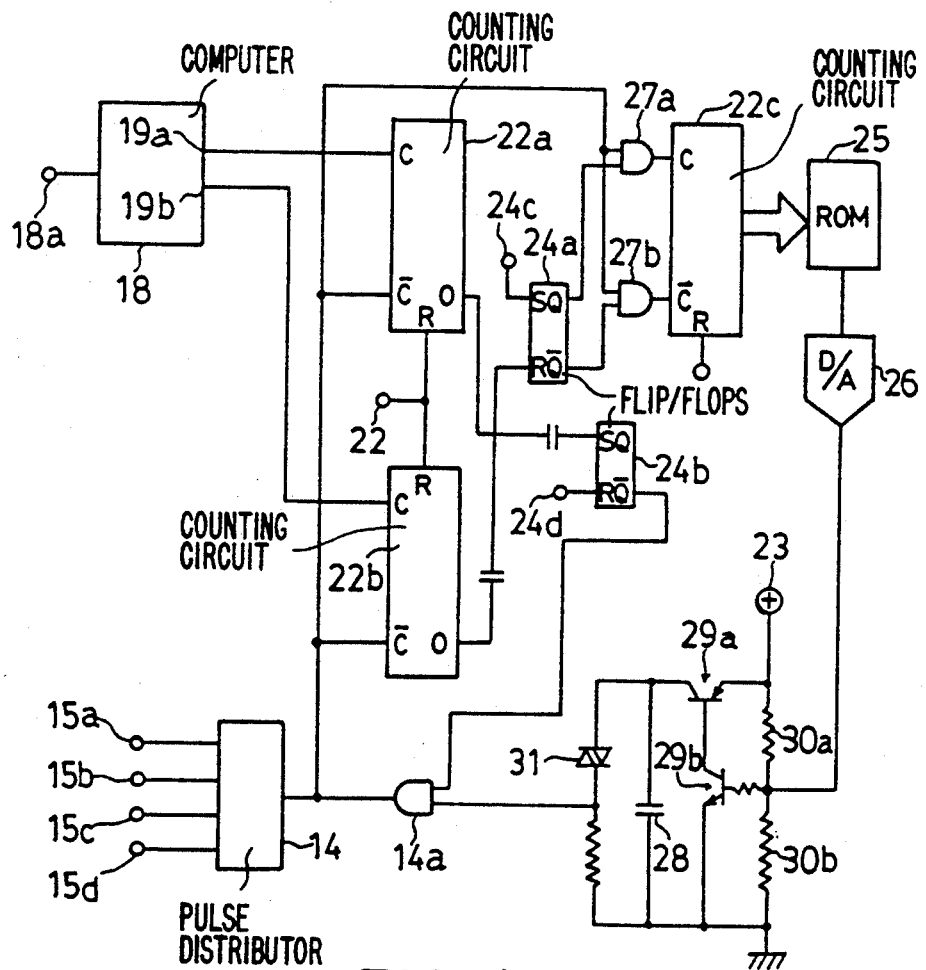
FIG. 4 is a stepping electric-signal generator circuit diagram to numerically control the load for the shortest time.

The following is a description of a numerical control driving means for a higher-speed load shown in FIG. 4.

The computer 18 stores the necessary number of types of numerical values for numerical control of a load.

When the electric signal to command the number of pulses for load control of N pulses is input from the terminal 18a, N pulses are output from the terminal 19a and counted by the counting circuit 22a. At the same time, $\frac{1}{2}$ N pulses are output from the terminal 19b and counted by the counting circuit 22b.

A set signal is input from the terminal 22 and each counting circuit is reset to 0 before the above counting operation starts.

The voltage of the terminal 23 is divided by the resistances 30a and 30b and the divided voltage is used as the base voltage of the transistor 29b.

Therefore, the base current set to the transistor 29a flows and the condenser 28 is charged by a current proportional to the base current.

The transistors 29a and 29b are operated in the active region.

When the charged voltage reaches the specified value, the trigger diode 31 is turned on to start discharge.

Therefore, a pulse oscillating circuit is made and its oscillation frequency increases proportionally to the base current of the transistor 29b.

The output of the pulse oscillating circuit is input to the pulse distributor 14 through the AND circuit 14a and the output of the distributor is output from the terminals 15a, 15b, etc.

The output of the terminal 15a, 15b, etc. is the same as that of the terminals with the same symbol previously mentioned in FIG. 3, which serves as a 2-phase full-wave stepping electric signal.

Therefore, by using the output for the input of the terminals 3a, 3b, etc. of the armature-current control circuit in FIG. 2(a), one step is executed for each output pulse of the AND circuit 14a.

The pulse distributor generally uses a circuit containing three JK-type flip-flop circuits.

To start driving the stepping motor, pulse electric signals are input from the terminals 24c and 24d.

The pulse electric signal brings the outputs of the terminal Q of the flip-flop circuit 24a and the terminal Q-bar of the flip-flop circuit 24b to a high level.

Because the upper-side input of the AND circuit 14a becomes high-level, the output of the pulse oscillating circuit is input to the pulse distributor 14 to start the stepping motor. The resistances 30a and 30b are selected so that the oscillation pulse frequency in this case will be the self-starting frequency. Also, because the lower-side input of the AND circuit 27a becomes high-level, the output (oscillation pulse) of the AND circuit 14a is input to the terminal "c" of the counting circuit 22c (which is already reset to 0 by the input of the terminal R) and counted up.

The set digital values are previously memorized in each address of the ROM 25.

Whenever data is counted up by the counting circuit 22c, the digital memory of the adress corresponding to each count is read and input to the D-A converting circuit 26, and the analog signal corresponding to the digital memory is output. This output slowly increases the voltage drop of the resistance 30b.

Therefore, because the base current of the transistor 29a correspondingly increases and the frequency of the pulse oscillating circuit also increases, the stepping motor is accelerated.

For acceleration, each constant of the electric circuit and digital memory of the ROM 25 are selected so that the motor speed will be maximized within the range in which no outstepping occurs.

As previously mentioned, the stepping motor of the present invention has a limit for the maximum speed.

When the oscillation frequency of the oscillation circuit approaches the limit for the maximum speed, the digital memory of the ROM 25 and the pulse oscillation frequency of the oscillation circuit are kept at a certain value respectively.

Therefore, the speed of the stepping motor is correspondingly kept constant. When the number of output pulses of the AND circuit decreases to ½ N pulses, subtraction is executed by the input of the terminal c-bar of the counting circuit 22b.

Therefore, the counting circuit 22b is set to 0, the terminal R of the flip-flop circuit 24a is electrified and reversed, the high-level output of the terminal Q-bar serves as the lower-side input of the AND circuit 27b, the lower-side input becomes high-level, and the output pulse of the AND circuit 27 can be obtained. The output of the AND circuit 27a is disconnected.

Therefore, because the counting circuit 22c is subtracted by the input pulse from the terminal c-bar, addresses of the ROM 25 are read backward, the output voltage of the D-A converting circuit 26 slowly decreases, and the pulse frequency of the oscillation circuit also slowly decreases.

Therefore, the stepping motor is decelerated.

The above-mentioned acceleration and deceleration are symmetrically executed. It is also necessary to prevent out-stepping for deceleration.

The output pulse of the AND circuit 14a is subtracted because it is also input to the terminal c-bar of the counting circuit 22a.

When N steps of the stepping motor are completed, the counting circuit 22a is reset to 0. The output is reversed because it is input to the terminal S of the flip-flop circuit 24b, the upper-side input of the AND circuit 14a is changed to a low level, and the change of the output of the pulse distributor 14 is stopped.

Therefore, the stepping motor stops, and the load, executed by N steps is stopped and held by the locking torque.

Figure 5:
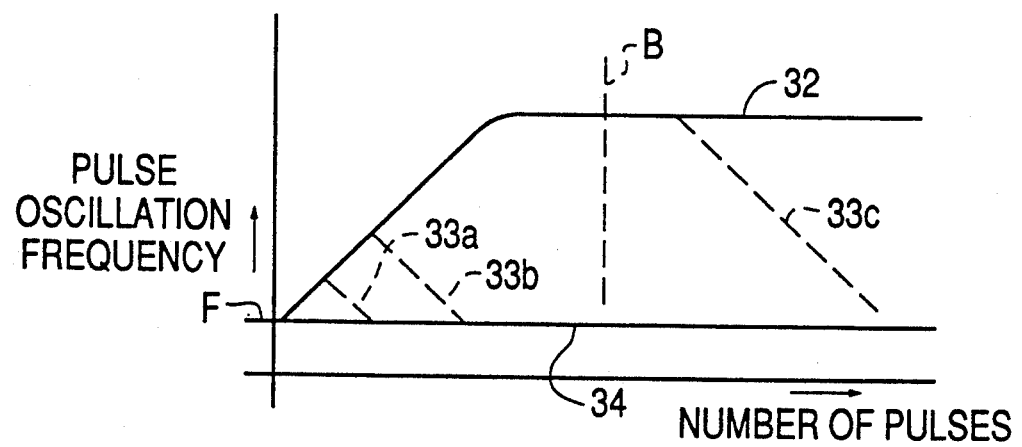
FIG. 5 is graph of the number of pulses and pulse oscillation frequency of the circuit shown in FIG. 4.

The graph in FIG. 5 shows the relation between the number of oscillation pulses (abscissa) which is the output of the AND circuit 14a and the pulse oscillation frequency (ordinate).

The stepping motor starts at the self-starting frequency F (shown by the straight line 34) and slowly increases the speed as shown by the stepping frequency curve 32. The motor is accelerated up to the maximum speed free from outstepping. The curve 32 levels off at the limit speed and the speed is kept at the maximum speed.

After ½ N steps are executed, the motor speed reaches the point on the broken line B and then decreases as shown by the curve 33c and the motor stops.

The broken line B is symmetric for the right and left (portion parallel to the curve 33c) of the curve 32.

If the number of steps N for numerical control is small, the motor is decelerated and stops as shown by the curve 33a because ½ N steps are completed at the leading edge of the curve 32.

For larger number of steps, the motor is decelerated and stops as shown by the broken line 33b.

The stepping speed control according to the present invention is characterized by the fact that numerical control of the load is always executed for the minimum time even if the number of steps is changed.

The following is a detailed description of excitation control of the exciting coils K and L according to FIG. 2(d).

The input of the terminals 12a, 12b, 12c, and 12d is the stepping signal which can obtained by the known circuit shown in FIG. 3.

In FIG. 3, the block circuit 13 is an oscillator which oscillates electric pulses with the specified frequency. The output electric pulse is input to the pulse distributor 14 and a 2-phase full-wave stepping electric signal is output from the terminals 15a, 15b, 15c, and 15d.

The outputs of the terminals 15a, 15b, etc. are input to the terminals 12a, 12b, etc. in FIG. 2(b) respectively.

Figure 6B:
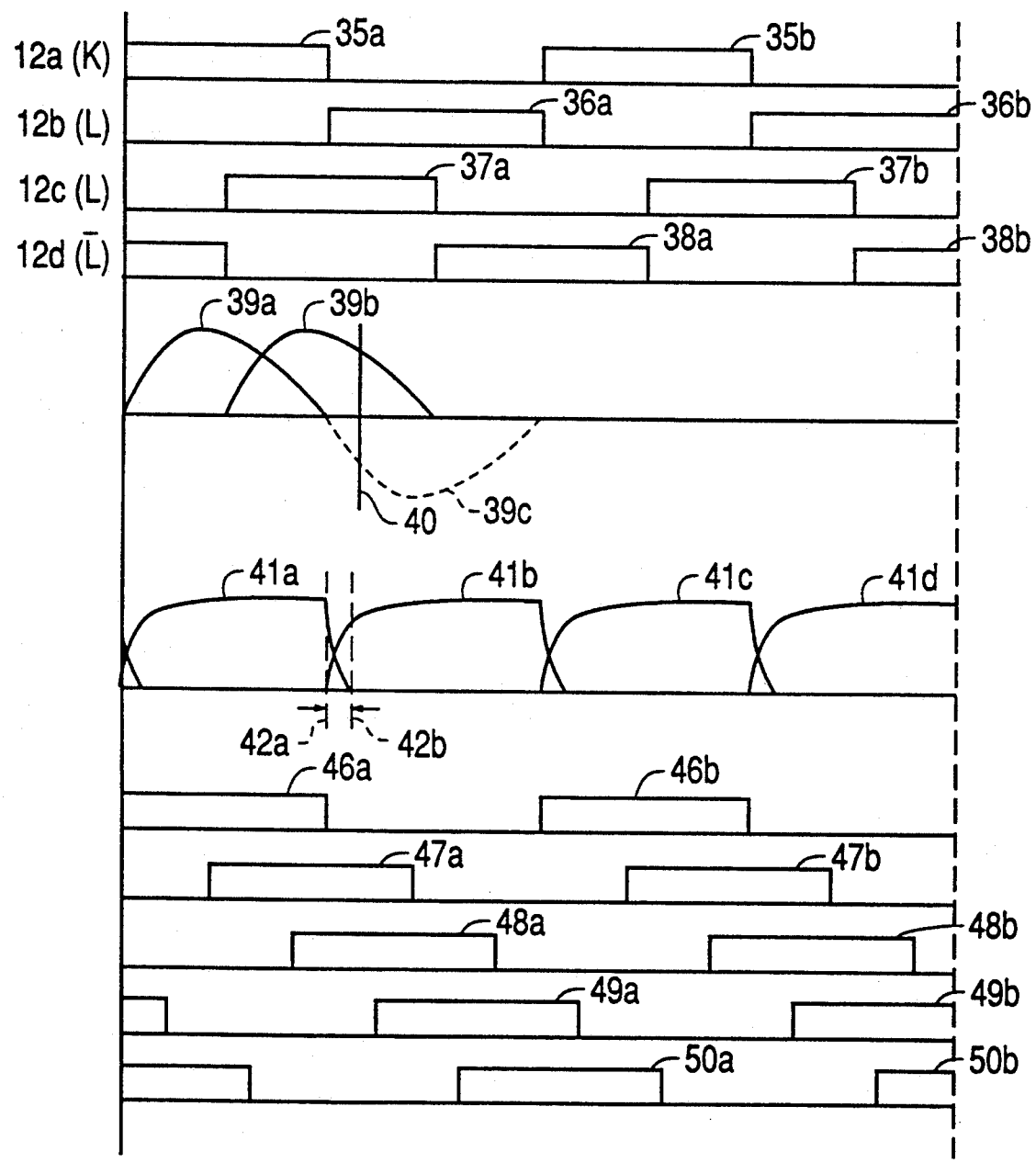

Inputs of the terminals 12a and 12b are shown as the curves 35a and 35b and the curves 36a and 36b in the time chart of FIG. 6(b).

The inputs of the terminals 12c and 12d are shown as the curves 37a and 37b and the curves 38a and 38b in FIG. 6(b) whose phase is delayed by 90°.

Because the transistors 7a and 7b are turned on by the electric signal of the curve 35a input to the terminal 12a, the exciting coil K is excited rightward. When the electric signal of the curve 37a is input from the terminal 12c after a certain time elapses, the transistors 8a and 8b are turned on and the exciting coil L is excited.

Therefore, the coil stops at the point where normal torque is balanced with reverse torque as previously mentioned about the torque curves 39a and 39b.

Then, because the electric signal of the curve 36a is input from the terminal 12b, the transistors 7c and 7d are turned on and the exciting coil K is excited leftward.

At the same time, because the input of the terminal 12a is disconnected, the transistors 7a and 7b are turned off.

The magnetic energy accumulated in the exciting coil K is returned to the power source from the terminals 2a and 2b through the diodes 11c and 11d according to a known means.

Therefore, it is impossible to decrease the reduction time of the magnetic energy unless the applied voltage is raised.

If the source voltage is raised, the exciting coil current excessively increases and burning occurs.

If a stepping operation is suddenly executed, reverse torque is generated by the discharge current of magnetic energy and the output torque is decreased.

Moreover, because start of excitation of the exciting coil L to be next excited is delayed, the torque is decreased.

The apparatus of the present invention has the effect to eliminate the above problems by adding the diodes 9a and 9b shown in FIG. 2(b).

That is, when excitation of the exciting coil K is stopped by the transistors 7a and 7b, discharge of accumulated magnetic energy is interrupted by the diode 9a. Therefore, high voltage rushes into the exciting coil K through the transistors 7c and 7d which are also turned on and magnetic energy is rapidly accumulated.

The curves 41a, 41b, 41c, and 41d in FIG. 6(b) show the curve for reciprocal excitation of the exciting coil K.

The width between the trailing edge of the curve 41a (rightward current of the exciting coil K) and the leading edge of the curve 41b (leftward current of the exciting coil L) becomes equal to the width between the broken lines 42a and 42b and the curves become very steep.

It takes 20 microseconds for a motor to output of 300 W. Therefore, even if the stepping frequncy is increased, no reverse or decrease torque mentioned above is generated. Thus, high-speed stepping is realized without problems.

Moreover, a low voltage can be used for the voltage between the power-source terminals 2a and 2b because only the specified exciting current may be supplied exceeding the counter electromotive force.

Also for reciprocal excitation of the exciting coil L according to the curves 37a and 37b and the curves 38a and 38b in FIG. 6(b), the above-mentioned effect is the same. The diode 9b also has the same effect as the diode 9a.

The condensers 10a and 10b require only a small capacitance because they are used to temporarily accumulate the magnetic energy discharged from the exciting coil.

Though this embodiment describes a 2-phase full-wave stepping motor, it can also be applied to 3-phase, 4-phase, ..., and n-phase full-wave stepping motors.

The present invention is used for the driving sources for robot arms and for stepping movement of automatic-machine members.

I claim:

1. A stepping motor comprising:
an n-phase (n=2, 3, 4, ...) full-wave rotor having salient poles;
n-phase exciting coils installed on n-phase magnetic poles;
semiconductor switching devices connected to both sides of first, second, third, ..., and n-th phase exciting coils configured into first and first-bar exciting coils, second and second-bar exciting coils, third and third-bar exciting coils, ..., and n-th and n-th-bar exciting coils, respectively;
diodes respectively inversely connected to a series connection respectively comprising said n-phase exciting coils and a transistor switch;
a DC power source applying voltage to said exciting coils through said semiconductor switching devices;
a first backflow-preventive diode, said first and first bar exciting coils connected to a positive or negative terminal of said DC power source through said first backflow-preventive diode;
an excitation control circuit including said second and second-bar exciting coils, said third and third-bar exciting coils, ..., and n-th and n-th-bar exciting coils respectively excited by similarly-connected second, third, ..., and n-th backflow-preventive diodes, and the first, second, ..., and n-th small capacity condensers connected between the positive and negative poles of said DC power source together with the back-flow-preventive diodes;
a specified-frequency n-phase full-wave stepping electric-signal generator;
a first electric circuit generating a stepping torque by electrifying the semiconductor switching devices connected to respectively-corresponding said first, second, third, ..., and n-th phase exciting coils by said stepping electric signal; and
a stepping electric-signal generator, said stepping electric-signal generator comprising:
a ROM including a digital memory;
a memory circuit memorizing a specified number of steps;
first and second counting circuits;
a second electric circuit, operatively connected to said first and second counting circuits, inputting said specified number of steps of said first counting circuits, inputting said specified number of steps to said first counting circuit and half said number of specified steps to said second counting circuit;
a third electric circuit for starting subtraction of said first and second counting circuits according to said number of specified steps, reading digital memory stores in said ROM, and inversely reading said digital memory of said ROM by a zero-count output signal from said second counting circuit when the stepping motor starts;
an oscillation circuit, connected to said ROM, converting the read signal from said ROM into an analog signal to obtain a frequency of oscillation pulse proportional to said analog signal;
a pulse distributor outputting n-phase full- or half-wave stepping electric signals by inputting the frequency of the output oscillation pulse from said oscillation circuit; and
a third electric circuit, connected to said pulse distributor, for starting input of the output stepping electric signal from said pulse distributor to said excitation control circuit by a driving start command electric signal of the reluctance-type stepping motor and to stop inputting the oscillation-circuit pulse to said pulse distributor when said first counting circuit counts zero.

2. A stepping motor comprising:

an n-phase (n=3, 4, 5, ... ) half-wave rotor having salient poles;

n-phase exciting coils installed on n-phase magnetic poles;

semiconductor switching devices connected to both sides of first, second, third, ... , and n-th phase exciting coils;

diodes respectively inversely connected to a series connection comprising said n-phase exciting coils and a transistor switch;

a DC power source, operatively connected to said exciting coils, for applying voltage to said exciting coils through said semiconductor switching devices;

first, second, third, ... , nth backflow-preventive diodes connected to a positive or negative pole of said DC power source in a forward direction and to said semiconductor switching devices for exciting said respective exciting coils;

first, second, third, ... , n-th small capacity condensers connected between the positive and negative poles of said DC power source together with said first, second, third, ... , nth backflow-preventive diodes;

an excitation control circuit including said second, third, ... , and n-th backflow-preventive diodes, and first, second, third, ... , and said n-th small capacity condensers;

a specified-frequency n-phase half-wave stepping electric-signal generator;

a first electric circuit generating stepping torque by electrifying said semiconductor switching devices connected to said respectively-corresponding first, second third, ... , and n-th phase exciting coils by said stepping electric signal; and a stepping electric-signal generator, comprising:

a ROM including a digital memory;

a memory circuit memorizing a specified number of steps;

first and second counting circuits;

a second electric circuit, operatively connected to said first and second counting circuits, inputting said specified number of steps to said first counting circuit and half said number of specified steps to said second counting circuit;

a third electric circuit for starting subtraction of said first and second counting circuits according to said number of specified steps, reading digital memory stores in said ROM, and inversely reading said digital memory of said ROM by the zero-count output signal from said second counting circuit when the stepping motor starts;

an oscillation circuit, connected to said ROM, converting the read signal from said ROM into an analog signal to obtain a frequency of oscillation pulse proportional to said analog signal;

a pulse distributor outputting n-phase full- or half-wave stepping electric signals by inputting the frequency of the output oscillation pulse from said oscillation circuit; and a third electric circuit, connected to said pulse distributor, for starting input of the output stepping electric signal from said pulse distributor to said excitation control circuit by a driving start command electric signal of the reluctance-type stepping motor and to stop inputting the oscillation-circuit pulse to said pulse distributor when said first counting circuit counts zero.

3. A stepping motor comprising:

an n-phase (n=2, 3, 4, ... ) full-wave magnet rotor;

n-phase exciting coils installed on n-phase magnetic poles of a fixed armature;

an excitation control circuit including several sets of transistors including exciting coils having various phases;

a DC power source, connected to said excitation control circuit, for applying voltage to said excitation control circuit;

"n" backflow-preventive diodes connected to said DC power source in a forward direction;

diodes inversely connected in parallel to transistors of said circuit to return magnetic energy to said DC power source when said n-phase exciting coils are turned off;

a first electric circuit, connected to said excitation control circuit, for supplying power to the excitation control circuit and including several sets of transistors through said "n" backflow-preventive diodes;

a specified-frequency n-phase full-wave stepping electric-signal generator;

an apparatus, connected to said excitation control circuit, for generating stepping torque by electrifying said excitation control circuit by said stepping electric signal; and a stepping electric-signal generator comprising:

a memory circuit for memorizing a specified number of steps;

first and second counting circuits;

a ROM;

a second electric circuit, connected to said memory circuit and said first and second counting circuits, for inputting said specified number of steps to said first counting circuit and half said number of specified steps to said second counting circuit;

a third electric circuit, connected to said first and second counting circuits, for starting subtraction of said first and second counting circuits according to said number of specified steps, reading a digital memory stored in said ROM, and reading backward the digital memory of said ROM by employing a zero-count output signal from said second counting circuit when the stepping motor starts;

an oscillation circuit, connected to said ROM, for converting the read signal of said ROM into an analog signal to obtain a frequency of an oscillation pulse proportional to said analog signal;

a pulse distributor, connected to said oscillation circuit, for outputting n-phase full- or half-wave stepping electric signals by inputting the frequency of the output oscillation pulse of said oscillation circuit and including an output stepping electric signal; and a fourth electric circuit, connected to said pulse distributor, for starting input to said output stepping electric signal of said pulse distributor to said excitation control circuit of the motor by the driving start command electric signal of the stepping motor and to stop inputting the oscillation-circuit pulse to said pulse distributor when said first counting circuit counts zero.

4. A stepping motor comprising:

an n-phase (n=3, 4, 5, ... ) half-wave magnet rotor;

n-phase exciting coils installed on n-phase magnetic poles of a fixed armature;

transistors connected to both sides of said exciting coils;

diodes respectively connected to a series connection comprising said n-phase exciting coils and a transistor switch;

a DC power source for applying voltage to said exciting coils through said transistors;

"n" backflow-preventive diodes connected to said DC power source in a forward direction;

an excitation control circuit for respectively electrifying said n-phase exciting coils through "n" backflow-preventive diodes;

"n" condensers having a specified capacity, respectively connected between output sides of said "n" backflow-preventive diodes and a negative pole of said DC power source;

a specified-frequency stepping electric-signal generator;

a first electric circuit, connected to said specified-frequency stepping electric signal generator, for generating stepping torque by electrifying said transistors connected to both sides of respectively-corresponding n-phase exciting coils by said stepping electric signal; and a stepping electric-signal generator comprising:
 a memory circuit for memorizing a specified number of steps;
 first and second counting circuits;
 a ROM;
 a second electric circuit, connected to said memory circuit and said first and second counting circuits, for inputting said specified number of steps to said first counting circuit and half said number of specified steps to said second counting circuit;
 a third electric circuit, connected to said first and second counting circuits, for starting subtraction of said first and second counting circuits according to the said number of specified steps, reading a digital memory stored in said ROM, and reading backward the digital memory of said ROM by employing a zero-count output signal from said second counting circuit when the stepping motor starts;
 an oscillation circuit, connected to said ROM, for converting the read signal of said ROM into an analog signal to obtain a frequency of an oscillation pulse proportional to said analog signal;
 a pulse distributor, connected to said oscillation circuit, for outputting n-phase full- or half-wave stepping electric signals by inputting the frequency of the output oscillation pulse of said oscillation circuit and including an output stepping electric signal; and
 a fourth electric circuit, connected to said pulse distributor, for starting into to said output stepping electric signal of said pulse distributor to said excitation control circuit of the motor by the driving start command electric signal of the stepping motor and to stop inputting the oscillation-circuit pulse to said pulse distributor when said first counting circuit counts zero.

* * * * *

UNITED STATES PATENT AND TRADEMARK OFFICE
CERTIFICATE OF CORRECTION

PATENT NO. : 5,231,342
DATED : JULY 27, 1993
INVENTOR(S) : Itsuki BAHN

It is certified that error appears in the above-indentified patent and that said Letters Patent is hereby corrected as shown below:

Col. 1, line 55, "and n-th-bar" should be --and n-th and n-th bar--;
       line 58, "apply" should be --applying--.

Col. 3, line 18, "said" should be --the--;
       line 19, "said" should be --the--.

Col. 4, line 8, "about FIG. 4," should be deleted;
       line 9, "FIG. 4" should be --FIG. 4,--;
       line 28, "show" should be deleted.

Col. 5, line 17, "1l" should be --16--.

Col. 6, line 28, "16a, and 16b," should be --16a' and 16b'--;
       line 38, "16a, and 16b," should be --16a' and 16b'--.

UNITED STATES PATENT AND TRADEMARK OFFICE
CERTIFICATE OF CORRECTION

PATENT NO. : 5,231,342
DATED : JULY 27, 1993
INVENTOR(S) : Itsuki BAHN

It is certified that error appears in the above-indentified patent and that said Letters Patent is hereby corrected as shown below:

Col. 9, line 65, "at periphery," should be --at the periphery,--.

Col. 11, line 24, "adress" should be --address--.

Signed and Sealed this

Seventh Day of June, 1994

BRUCE LEHMAN

Attest:

Attesting Officer

Commissioner of Patents and Trademarks